Nov. 15, 1960
R. A. SAHLIN
2,960,032
ELECTRIC PRIMER
Filed Dec. 13, 1955
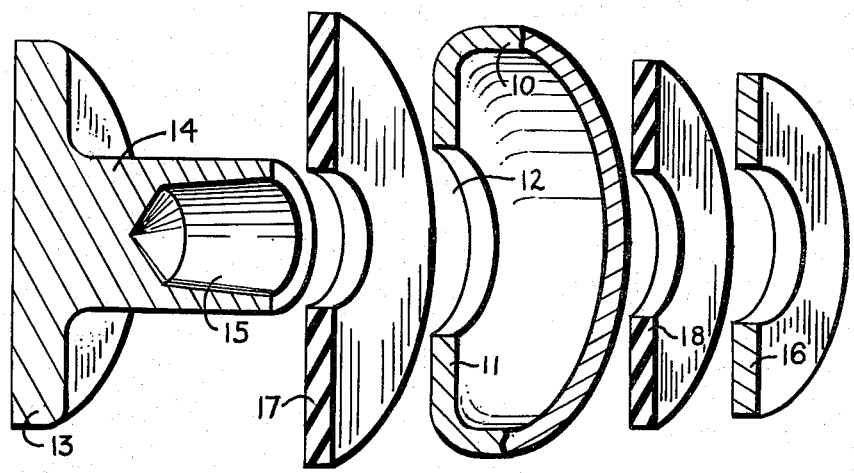
FIG 1
FIG 2
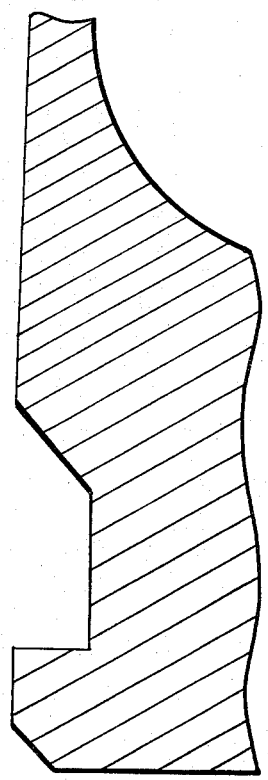
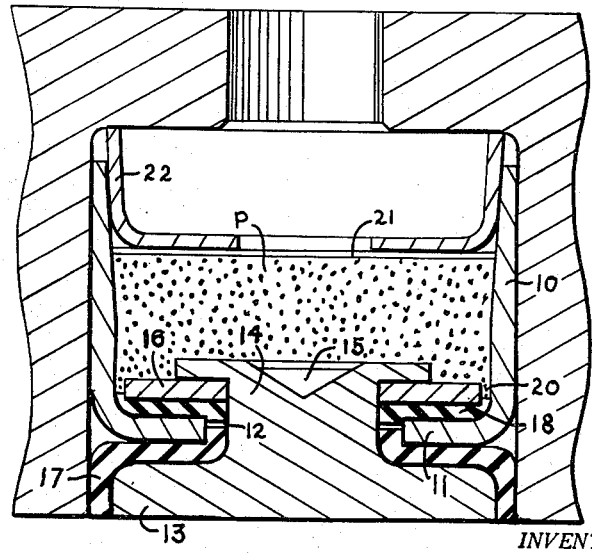
INVENTOR.
RICHARD A. SAHLIN
BY
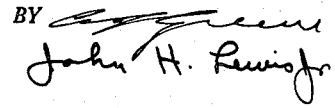

United States Patent Office 2,960,032
Patented Nov. 15, 1960

2,960,032
ELECTRIC PRIMER

Richard A. Sahlin, Fairfield, Conn., assignor to Remington Arms Company, Inc., Bridgeport, Conn., a corporation of Delaware Filed Dec. 13, 1955, Ser. No. 552,761

1 Claim. (Cl. 102—46)

This invention relates to electric primers for ammunition and contemplates certain improvements and simplification in such primers and their manner of assembly.

In the drawings:

Fig. 1 is an exploded perspective showing components of a primer according to the present invention prior to assembly.

Fig. 2 is a sectional view of the assembled primer in place in the head portion of a cartridge.

The essential features of an electric primer are a container for the priming mixture, which container is adapted to be secured in a suitable recess or aperture in a cartridge case; and a contact piece which is accessible from the outside, is insulated from the container and is so located with respect to the priming mixture and the container as to afford a passage for an electric current from the contact piece through a portion of the mixture and to the grounded container. The primer of the present invention comprises a container or primer cup 10 having an open mouth and a head 11 provided with an aperture 12 which is preferably substantially circular. The contact piece has the configuration of a rivet comprising a head 13 and a shank 14, the end portion of the shank comprising a recess 15 which is preferably tapered so that it can be formed by a punching operation. The head 13 of the rivet of somewhat greater diameter than the interior diameter of cup 10 but is of less diameter than the exterior of the cup 10 for reasons which will hereinafter appear.

The diameter of the shank 14 of the rivet is less than the diameter of the aperture 12 in the primer cup to provide an insulating space between the shank and the cup. A metal washer 16 is applied to the end portion of the rivet shank and bodies of insulating material 17 and 18 surround the rivet shank and serve to insulate the rivet and washer 16 from the primer cup. The bodies 17 and 18 are of plastic material and, as prepared for assembly with the other components, they are in the form of apertured flat disks or washers, the apertures in both substantially conforming to the diameter of the rivet shank 14. The exterior diameter of the washer 17 is somewhat larger than the exterior diameter of the cup 10 and the exterior diameter of washer 18 substantially conforms to the interior diameter of cup 10 so that it serves to hold the rivet shank spaced from the margin of aperture 12 in the primer cup head.

In assembly, an insulating washer 17 is applied to the rivet shank and the shank is then inserted through the cup aperture 12. An insulating washer 18 is applied to the rivet shank inside the cup and the metal washer 16 is applied over the insulating washer 18. The assembly is then subjected to compression between a suitable support applied to the rivet head 13 and a tool adapted to split the recessed end of the rivet over the exposed face of washer 16, as shown at 141, Fig. 2, thus securing the assembly together. The compressive force is such as to cause a flow of the plastic material of the insulating washer into a portion of the space between rivet shank 14 and the margin of the aperture 12, thus insuring that the rivet or contact piece is insulated from the cup body. The compression, likewise, displaces the annular margin of the washer 17 which projects beyond the rivet head 13 into a cylindrical form surrounding said head and having an exterior diameter substantially the same as the exterior diameter of the cup 10.

A priming composition P is then pressed into the assembled cup, a portion thereof being compacted in the annular gap 20 between the periphery of the washer 18 and the interior wall of the cup, the diameter of washer 18 being so selected with respect to the particular priming composition and the firing voltage as to supply the electrical resistance requisite to insure that the passage of current from the margin of the washer to the body of the primer cup will properly ignite the priming mixture. The assembly of the primer is completed by the insertion of a sealing foil 21 and a support cup 22 which provides mechanical backing for the priming composition P and avoids displacement thereof if the loaded round is subjected to rough handling.

It is essential that the diameter of the rivet head 13 be greater than the interior diameter of the primer cup. When a cartridge containing the primer is fired, the rivet head 13 is solidly supported against the face of the breech bolt, while the cup is supported against rearward movement under the high pressure which is applied to it only by its assembly to the rivet. If the rivet head is not of greater diameter than the cup interior, a shear is provided which may detach the cylindrical portion of the cup from its head. It is further important that the rivet head be surrounded by a cylinder of insulating material, both to insure that the rivet is insulated from the metal of the cartridge case and to fill the gap which would otherwise exist between the rivet head and the metal of the cartridge case.

What is claimed is:

An electrical primer of the type in which ignition is accomplishel by passing an electric current through a conductive, high resistance priming composition, comprising in combination, a conductive cup for said priming composition having a continuous side wall and a cup base formed to define an aperture therein, a rivet electrode having a head of greater diameter than the interior diameter of said cup and a shank of lesser diameter than the aperture formed in said base mounted with said head external to said apertured cup base and said shank extending through said apertured cup base into said cup, a metal washer within said cup mounted in electrical contact with said shank and secured thereto by the upsetting of said rivet shank, said washer having its peripheral edge in spaced relation to the continuous side wall of said cup and defining, between said edge and said side wall, an annular gap bridged by a conductive, high resistance, priming composition in said cup, and plastic insulating material disposed on either side of said apertured cup base and extending into said aperture to insulate said rivet-washer structure from said apertured cup base, whereby electrical current may pass from said rivet-washer structure to said cup only through the priming composition bridging said annular gap.

References Cited in the file of this patent

UNITED STATES PATENTS

| 319,628 | Russel | June 9, 1885 |
| 1,533,199 | Martin | Apr. 14, 1925 |
| 1,530,004 | Lucas | Mar. 17, 1925 |
| 2,696,191 | Sheehan | Dec. 7, 1954 |

FOREIGN PATENTS

| 6,053 | Great Britain | of 1896 |
| 967,649 | France | Mar. 29, 1950 |